United States Patent [19]

Bailey et al.

[11] 4,426,326

[45] Jan. 17, 1984

[54] NONDIFFUSIBLE, METAL-COMPLEXED AZO DYE-RELEASING COMPOUNDS

[75] Inventors: Joseph Bailey, Bushey Heath; David Clarke, Watford; Linda G. Johnston, Wealdstone, all of England

[73] Assignee: Eastman Kodak Company, Rochester, N.Y.

[21] Appl. No.: 392,482

[22] Filed: Jun. 28, 1982

Related U.S. Application Data

[62] Division of Ser. No. 324,214, Nov. 23, 1981, Pat. No. 4,358,527.

[30] Foreign Application Priority Data

Nov. 24, 1980 [GB] United Kingdom ................ 8037643

[51] Int. Cl.[3] ...................... C09B 45/02; C09B 45/12; C09B 45/22; C09B 45/32

[52] U.S. Cl. ............................ 260/146 R; 260/145 B; 260/146 D; 260/146 T; 260/147; 260/156; 260/163

[58] Field of Search ........... 260/146 R, 146 D, 146 T, 260/145 B, 147

[56] References Cited

U.S. PATENT DOCUMENTS

| | | | |
|---|---|---|---|
| 4,204,870 | 5/1980 | Chapman et al. | 260/146 R X |
| 4,204,993 | 5/1980 | Chapman et al. | 260/156 X |
| 4,272,434 | 6/1981 | Baigrie | 260/156 X |
| 4,273,706 | 6/1981 | Chapman et al. | 260/156 X |

*Primary Examiner*—Floyd D. Higel

*Attorney, Agent, or Firm*—Harold E. Cole

[57] ABSTRACT

Nondiffusible compounds having a releasable azo dye moiety have the formula:

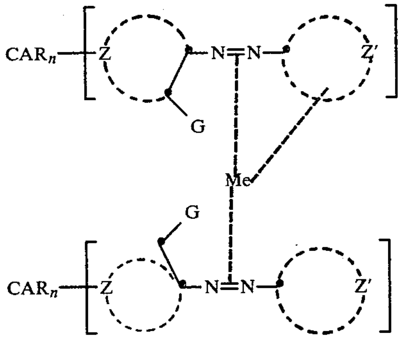

wherein:

(a) each Z and $Z^1$ completes an aromatic carbocyclic or heterocyclic nucleus having at least one ring of 5 to 7 atoms;

(b) G is a metal chelating group;

(c) each CAR is a ballasted carrier moiety;

(d) Me is a polyvalent, hexacoordinate metal ion; and (e) each n is 0 or 1, with the proviso that at least one n is 1.

These compounds are useful as dye-releasers in photographic elements.

19 Claims, No Drawings

NONDIFFUSIBLE METAL-COMPLEXED AZO DYE-RELEASING COMPOUNDS

This is a division of application Ser. No. 324,214, filed Nov. 23, 1981, now U.S. Pat. No. 4,358,527, issued Nov. 9, 1982.

This invention relates to photography and more particularly to color diffusion transfer photography employing certain nondiffusible, metal-complexed, azo dye-releasing compounds and precursors thereof which, as a function of development of a silver halide emulsion layer, release a diffusible azo dye or precursor thereof.

In U.S. Pat. No. 4,076,529 issued Feb. 28, 1978, nondiffusible dye releasing compounds are disclosed. Among the various dye moieties disclosed which can be released are "metal complexed dyes". No specific structures are shown, however.

A premetallized azo dye attached to a ballasted carrier moiety which releases the dye as a function of development is disclosed in Japanese Publication No. 106727/1977. The specific compounds of our invention are not disclosed, however.

U.S. Pat. No. 4,142,891 of Baigrie et al relates to various nondiffusible azo dye-releasing compounds having a releasable azo dye moiety. When the dye moiety is released, it diffuses to an image-receiving layer where it is then contacted with metal ions to form a stable metal complex. These dye-releasing compounds are described as being metallizable, i.e., they are capable of forming a metal complex at some step in the process. In column 1, lines 40–45 of that patent, reference is made to the April 1977 edition of Research Disclosure, pages 32–39, which discloses "premetallized dyes" which "are large molecules which diffuse more slowly than unmetallized dyes, resulting in long access times for image formations." It would have been thought that a 2:1 complex of dye:metal, which would be about twice as large as the 1:1 complexes described in this article, would be even more undesirable in this respect.

We have unexpectedly found, however, that certain 2:1 dye:metal complexes of certain azo dye-releasing compounds diffuse surprisingly well, as compared to 1:1 complexes, and are advantageous in not having to provide metals in the mordant layer. Free metal ions might increase Dmin and may also tend to wander throughout the element. In many instances, a higher Dmax and a lower Dmin are also obtained using the premetallized redox dye-releasers (RDR's) of this invention in comparison to their unmetallized counterparts.

It would be desirable to provide improved metal-complexed, azo dye-releasing compounds so that the dye which is released imagewise during processing can diffuse to an image-receiving layer to form a metal-complexed, dye transfer image having better hues, less unwanted absorption, narrower bandwidths, rapid diffusion rates and shorter access times than those of the prior art, as well as good stability to heat, light and chemical reagents.

A photographic element in accordance with the invention comprises a support having thereon at least one photosensitive silver halide emulsion layer, said emulsion layer having associated therewith a dye image-providing material comprising a nondiffusible compound having at least one releasable azo dye moiety or precursor thereof, having the following formula:

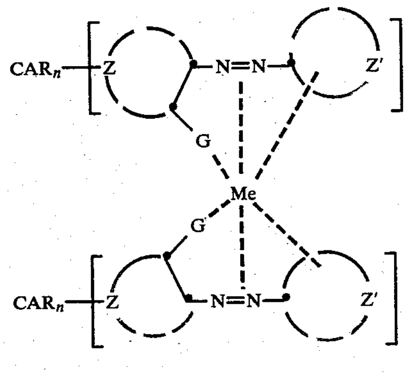

wherein:

(a) each Z independently represents the atoms necessary to complete an aromatic carbocyclic or heterocyclic nucleus having at least one ring of 5 to 7 atoms;

(b) each Z′ independently represents an aromatic carbocyclic or heterocyclic nucleus having at least one ring of 5 to 7 atoms, the Z′ having, in a position adjacent to the point of attachment to the azo linkage, either (i) a nitrogen atom in the ring of the nucleus which acts as a chelating site, or (ii) a carbon atom in the ring of the nucleus having directly attached thereto a nitrogen atom which acts as a chelating site;

(c) G is a metal chelating group;

(d) CAR is a ballasted carrier moiety capable of releasing the diffusible azo dye moiety or precursor thereof as a function of development of the silver halide emulsion layer under alkaline conditions;

(e) Me is a polyvalent, hexacoordinate metal ion; and (f) each n is 0 or 1 with the proviso that at least one n is 1.

Other substituents may also be present in the rings illustrated above, such as alkyl of 1 to 6 carbon atoms, acyl, aryl of 6 to 10 carbon atoms, aralkyl, alkylsulfonyl, amino, alkoxy, halogens, solubilizing groups such as sulfonamide, sulfamoyl, phenylsulfamoyl, carboxy, sulfo or hydrolyzable precursors thereof.

In the above formula, Z can be, for example, phenyl, pyridyl, naphthyl, pyrazolyl, or indolyl, while Z′ can be, for example, imidazole, pyrazole, pyridine, pyridine-3-ol, 1H-pyrazolo[3,2-c]-s-triazole, 2,4-diphenyl-imidazole and 4,5-diphenyl-imidazole. Each Z can be the same or different in the above formula. Each Z′ can also be the same or different. Thus, two dye moieties which are the same can be complexed to the metal, or two different dye moieties of the same color or of different colors can be complexed, depending upon the results desired.

Although the two dye moieties are shown as being planar, the two planes are essentially perpendicular to each other, not coplanar as the structures would imply. Since the two dye moieties are perpendicular to each other, the spectra of the two chromophores are relatively unaffected by interaction.

In a preferred embodiment of our invention, each Z represents the atoms necessary to complete a naphthyl group and each Z′ represents a pyridine nucleus. In another preferred embodiment of our invention, each Z and each Z′ independently represents the atoms necessary to complete a pyrazole group.

In the above formula, G can be any metal chelating group as long as it performs the desired function of coordinating with the metal. The above metal chelate can be formed by the loss of a proton from a conjugate acid, thereby forming a conjugate base, or by sharing a pair of electrons with the metal. In a preferred embodiment, G can be the conjugate base of hydroxy, carboxy, sulfonamido or sulfamoyl. For example, a conjugate base of a carboxy group is the carboxylate, COO, which is formed by the loss of a proton. In another preferred embodiment, G can be an amino group or an alkylthio group which shares a pair of electrons without ionization to form the complex.

In the above formula, Me can be any polyvalent, hexacoordinate metal ion as long as it performs the desired function of forming a 2:1 dye:metal complex. There may be employed, for example, copper (II), zinc (II), platinum (II), palladium (II), cobalt (II), cobalt (III), chromium (III), or especially nickel (II) ions.

In general, compounds according to our invention can be prepared by first using the general methods described in U.S. Pat. No. 4,142,891 to prepare the unmetallized compounds, and then metallizing the compounds by dissolving them and a metal salt in a mutual solvent, such as dimethylformamide, and allowing the metallization to take place at room temperature.

In a preferred embodiment of our invention, the metal complexed dye moieties released from the metallized redox dye-releasers of our invention would have a rate of diffusion to a mordant layer on a receiver such that one-half of the final maximum dye density on the mordant layer is obtained in less than about fifteen minutes, preferably less than ten minutes. This "t-½ of dye diffusion" may be measured according to the following test:

(a) A dye moiety released from a metallized RDR to be tested is obtained and is imbibed into a donor element comprising a deionized bone gelatin layer [26 g/$m^2$, containing two percent bis(vinylsulfonylmethyl) ether hardener] coated on a transparent film support from a solution about $1.3\times10^{-3}$ M in dye and 0.1 M in potassium hydroxide. The layer is soaked to full penetration for about twenty minutes and surface wiped.

(b) A receiving element is prepared by coating on a transparent support (1) a layer of 2.3 g/$m^2$ of a gelatin and 2.3 g/$m^2$ of poly(styrene-co-N-vinylbenzyl-N-benzyl-N,N-di methylammonium chloride-co-divinylbenzene), (2) a reflecting layer of titanium dioxide (16.1 g/$m^2$), dispersed in gelatin (2.6 g/$m^2$), (3) an opaque layer of carbon black (1.88) and a gelatin (1.23), and (4) a layer of gelatin (4.3 g/$m^2$) hardened with bis(vinylsulfonylmethyl) ether (two percent of total gelatin).

(c) The receiver element (b) is presoaked for about five minutes in 0.1 M potassium hydroxide and laminated to the donor element (a). The reflection dye densities read through the transparent support are determined continuously over an interval of time sufficient so that a plateau is reached at Dmax.

(d) The dye densities on the receiver (b) at λmax of the dye are transformed mathematically into transmission densities and then plotted against time. The time at which a density one-half that of Dmax is determined from the plot and is the "t-½ of dye diffusion". Useful dyes would have a t-½ of dye diffusion of less than about fifteen minutes, preferably less than about ten minutes.

(e) In order to verify that the complex has not been demetallized during transfer, a portion of the receiver (b) with the transferred dye is then soaked in a pH 5 buffer solution and another is soaked in a 1 M $Ni(NO_3)_2$ solution. The spectrophotometric curves of these samples are then obtained and compared to that of the released dye being transferred. Significant spectral change in the curves of either of these solutions from the untreated transferred image indicates demetallization of the complex during transfer. Useful dyes should remain substantially as the metal complex.

There is great latitude in selecting a CAR moiety which is attached to the dye-releasing compounds described above. Depending upon the nature of the ballasted carrier selected, various groups may be needed to attach or link the carrier moiety to the dye. Such linking groups are considered to be a part of the CAR moiety in the above definition. It should also be noted that, when the dye moiety is released from the compound, cleavage may take place in such a position that part or all of the linking group, if one is present, and even part of the ballasted moiety, may be transferred to the image-receiving layer, along with the dye moiety. In any event, the dye nucleus as shown above can be thought of as the minimum which is transferred.

CAR moieties useful in the invention are described in U.S. Pat. Nos. 3,227,550; 3,628,952; 3,227,552 and 3,844,785 (dye released by chromogenic coupling); U.S. Pat. Nos. 3,443,939 and 3,443,940 (dye released by intramolecular ring closure); U.S. Pat. Nos. 3,698,897 and 3,725,062 (dye released from hydroquinone derivatives); U.S. Pat. No. 3,728,113 (dye released from a hydroquinonylmethyl quaternary salt); U.S. Pat. Nos. 3,719,489 and 3,443,941 (silver ion induced dye release); British Patent Publication No. 2,017,950A (dye released by a dye bleach process); U.S. pat. Nos. 4,053,312; 4,198,235; 4,179,231; 4,055,428 and 4,149,892 (dye released by oxidation and deamidation); and U.S. Pat. Nos. 3,245,789 and 3,980,497; Canadian Pat. No. 602,607; British Pat. No. 1,464,104; *Research Disclosure* 14447, April 1976; U.S. Pat. No. 4,139,379 to Chasman et al, U.S. Pat. No. 4,232,107 and European Patent Publication 12908 (dye released by miscellaneous mechanisms), the disclosures of which are hereby incorporated by reference.

In a further preferred embodiment of the invention, the ballasted carrier moiety or CAR as described above may be represented by the following formula:

(Ballast-Carrier-Link)— wherein:

(a) Ballast is an organic ballasting radical of such molecular size and configuration as to render said compound nondiffusible in said photographic element during development in an alkaline processing composition;

(b) Carrier is an oxidizable acyclic, carbocyclic or heterocyclic moiety (see "The Theory of the Photographic Process", by C. E. K. Mees and T. H. James, Third Edition, 1966, pages 282 to 283), e.g., moieties containing atoms according to the following configuration:

$$a\,(-C{=}C)_b-$$

wherein:

b is a positive integer of 1 to 2; and a represents the radicals OH, SH, NH or hydrolyzable precursors thereof; and (c) Link represents a group which, upon oxidation of said Carrier moiety, is capable of being hydrolytically cleaved to release the diffusible azo dye. For example, Link may be the following groups:

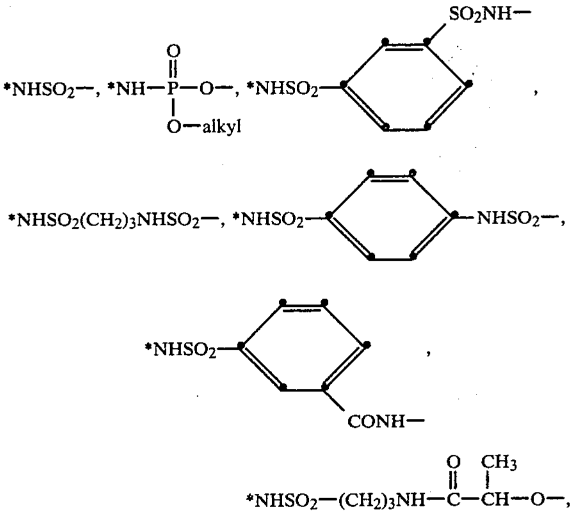

wherein * represents the position of attachment to Carrier.

The Ballast group in the above formula is not critical, so long as it confers nondiffusibility to the compound. Typical Ballast groups include long-chain alkyl radicals, as well as aromatic radicals of the benzene and naphthalene series linked to the compound. Useful Ballast groups generally have at least 8 carbon compound, such as substituted or unsubstituted alkyl groups of 8 to 22 carbon atoms; a carbamoyl radical having 8 to 30 carbon atoms, such as $—CONH(CH_2)_4—O—C_6H_3(C_5H_{11})_2$, or $—CON(C_{12}H_{25})_2$; or a keto radical having 8 to 30 carbon atoms, such as $—CO—C_{17}H_{35}$ or $—CO—C_6H_4(t—C_{12}H_{25})$.

For specific examples of Ballast-Carrier moieties useful as the CAR moiety in this invention, reference is made to the November 1976 edition of *Research Disclosure,* pages 68 through 74, and the April 1977 edition of *Research Disclosure,* pages 32 through 39, the disclosures of which are hereby incorporated by reference.

In a highly preferred embodiment of the invention, the ballasted carrier moiety or CAR in the above formula is a group having the formula:

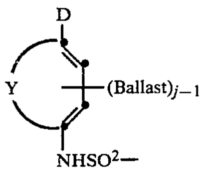

wherein:

(a) Ballast is an organic ballasting radical of such molecular size and configuration (e.g., simple organic groups or polymeric groups) as to render said compound nondiffusible in a photographic element during development in an alkaline processing composition;

(b) D is $OR^1$ or $NHR^2$ wherein $R^1$ is hydrogen or a hydrolyzable moiety, such as acetyl, mono-, dior trichloroacetyl radicals, perfluoroacyl, pyruvyl, alkoxyacyl, nitrobenzoyl, cyanobenzoyl, sulfonyl or sulfinyl, and $R^2$ is hydrogen or a substituted or unsubstituted alkyl group of 1 to 22 carbon atoms, such as methyl, ethyl, hydroxyethyl, propyl, butyl, secondary butyl, tertbutyl, cyclopropyl, 4-chlorobutyl, cyclobutyl, 4-nitroamyl, hexyl, cyclohexyl, octyl, decyl, octadecyl, dodecyl, benzyl or phenethyl (when $R^2$ is an alkyl group of greater than 8 carbon atoms, it can serve as a partial or sole Ballast);

(c) Y represents at least the atoms necessary to complete a benzene nucleus, a naphthalene nucleus, or a 5- to 7-membered heterocyclic ring, such as pyrazolone or pyrimidine; and (d) j is a positive integer of 1 to 2 and is 2 when D is $OR^1$ or when $R^2$ is hydrogen or an alkyl group of less than 8 carbon atoms.

Especially good results are obtained in the above formula when D is OH, j is 2, and Y is a naphthalene nucleus.

Examples of the CAR moiety in this highly preferred embodiment are disclosed in U.S. Pat. Nos. 4,076,529; 3,993,638 and 3,928,312, the disclosures of which are hereby incorporated by reference, and include the following:

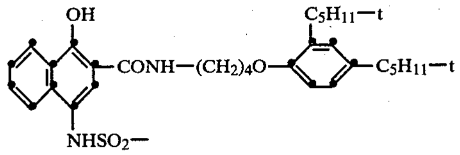

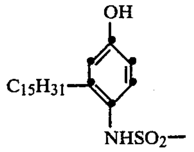

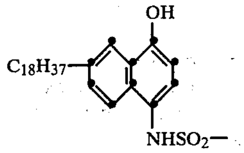

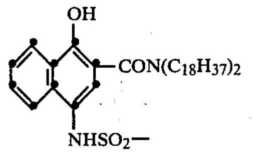

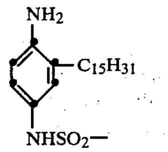

In another highly preferred embodiment of the invention, the ballasted carrier moiety or CAR in the above formulas is such that the diffusible azo dye is released as an inverse function of development of the silver halide emulsion layer under alkaline conditions. This is ordinarily referred to as positive-working dye-release chemistry. In one of these embodiments, the ballasted carrier moiety or CAR in the above formulas may be a group having the formula:

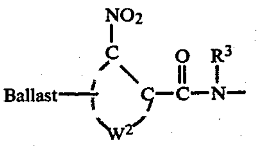
(I)

wherein:

- Ballast is an organic ballasting radical of such molecular size and configuration as to render said compound nondiffusible in a photographic element during development in an alkaline processing composition;
- $W^2$ represents at least the atoms necessary to complete a benzene nucleus (including various substituents thereon); and
- $R^3$ is an alkyl (including substituted alkyl) radical having 1 to about 4 carbon atoms.

Example of the CAR moiety in this formula (I) include the following:

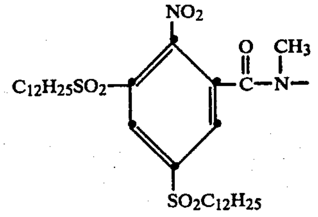

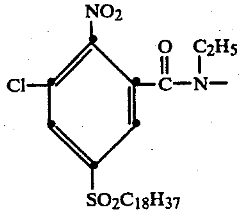

In a second embodiment of positive-working dye-release chemistry as referred to above, the ballasted carrier moiety or CAR in the above formulas may be a group having the formula:

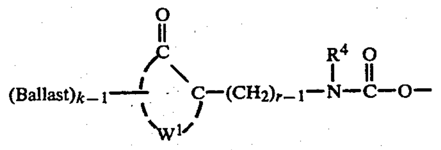
(II)

wherein:

- Ballast is an organic ballasting radical of such molecular size and configuration as to render said compound nondiffusible in a photographic element during development in an alkaline processing composition;
- $W^1$ represents at least the atoms necessary to complete a quinone nucleus (including various substituents thereon);
- r is a positive integer of 1 or 2;
- $R^4$ is an alkyl (including substituted alkyl) radical having 1 to about 40 carbon atoms or an aryl (including substituted aryl) radical having 6 to about 40 carbon atoms; and
- k is a positive integer of 1 to 2 and is 2 when $R^4$ is a radical of less than 8 carbon atoms.

Examples of the CAR moiety in this formula (II) include the following:

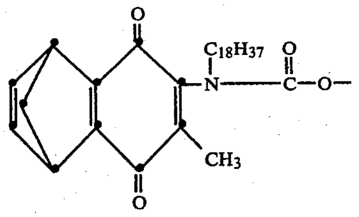

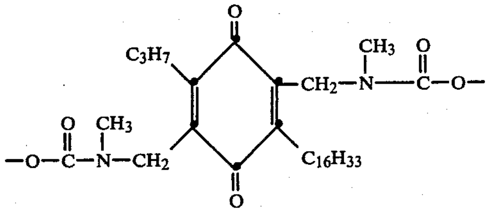

In using the compounds in formulas I and II above, they are employed in a photographic element similar to the other nondiffusible dye-releasers described previously. Upon reduction of the compound as a function of silver halide development under alkaline conditions, the metallizable azo dye is released. In this embodiment, conventional negative-working silver halide emulsions, as well as direct-positive emulsions, can be employed. For further details concerning these particular CAR moieties, including synthesis details, reference is made to U.S. Pat. No. 4,139,379 of Chasman et al, the disclosure of which is hereby incorporated by reference.

In a third embodiment of positive-working dye-release chemistry as referred to above, the ballasted carrier moiety or CAR in the above formulas may be a group having the formula:

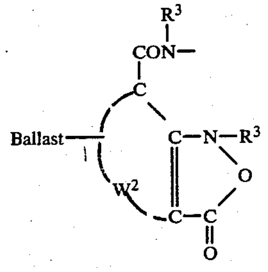
(III)

wherein: Ballast, $W^2$ and $R^3$ are as defined for formula (I) above.

Examples of the CAR moiety in this formula (III) include the following:

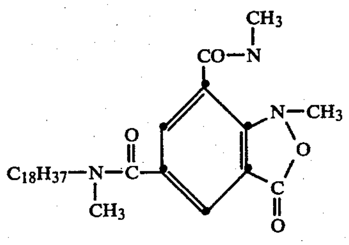

-continued

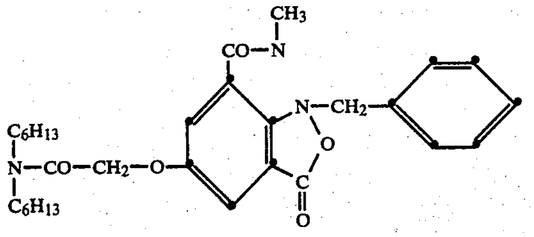

For further details concerning this particular CAR moiety, including synthesis details, reference is made to U.S. Pat. No. 4,199,354 of Hinshaw et al, the disclosure of which is hereby incorporated by reference.

In a fourth embodiment of positive-working dye-release chemistry as referred to above, the ballasted carrier moiety or CAR in the above formulas may be a group having the formula:

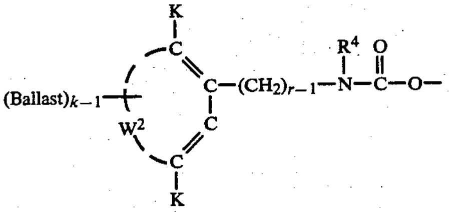

(IV)

wherein:

Ballast, r, $R^4$ and k are as defined for formula (II) above;

$W^2$ is as defined for formula (I) above; and

K is OH or a hydrolyzable precursor thereof.

Examples of the CAR moiety in this formula (IV) include the following:

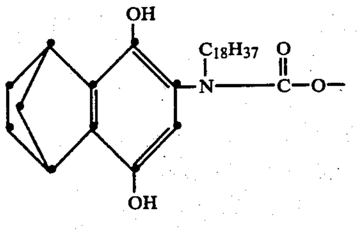

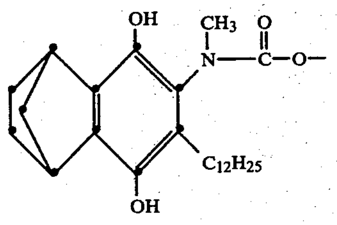

For further details concerning this particular CAR moiety, including synthesis details, reference is made to U.S. Pat. No. 3,980,479 of Fields et al, the disclosure of which is hereby incorporated by reference.

Representative compounds included within the scope of the invention include the following:

(1)

-continued

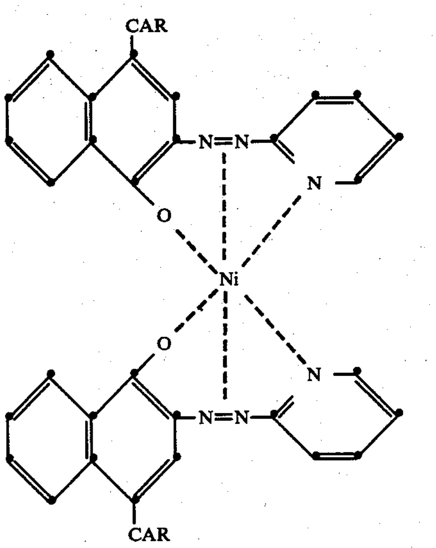

(2)

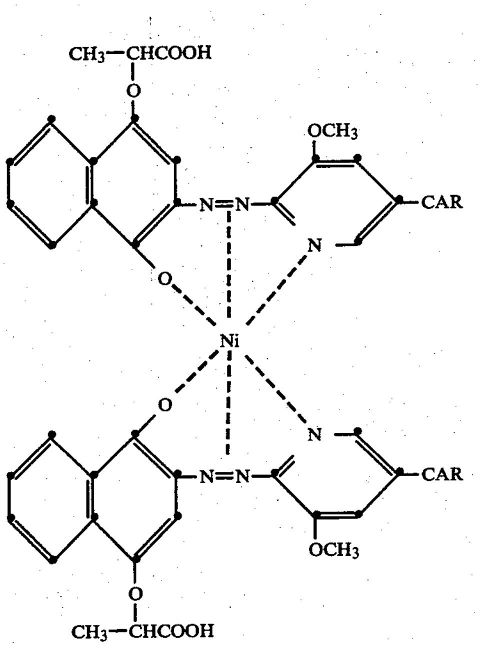

(3)

-continued
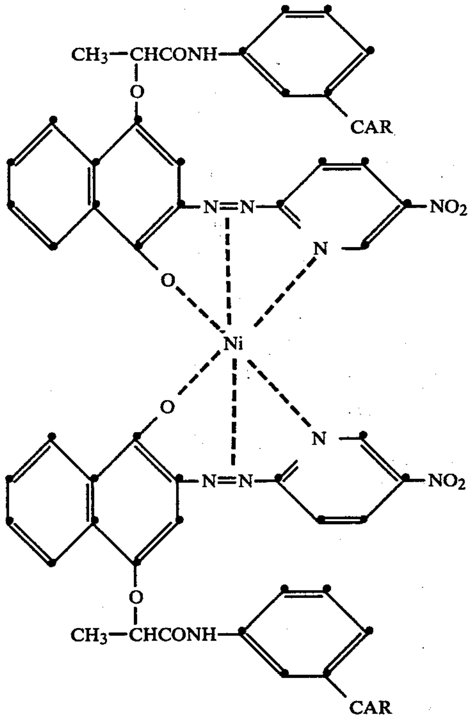
(4)
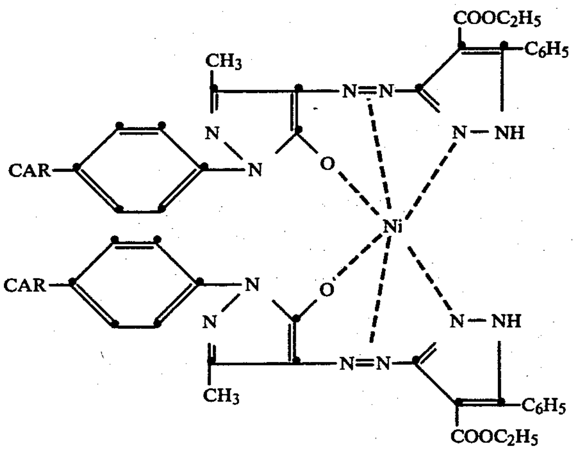
(5-9)
-continued
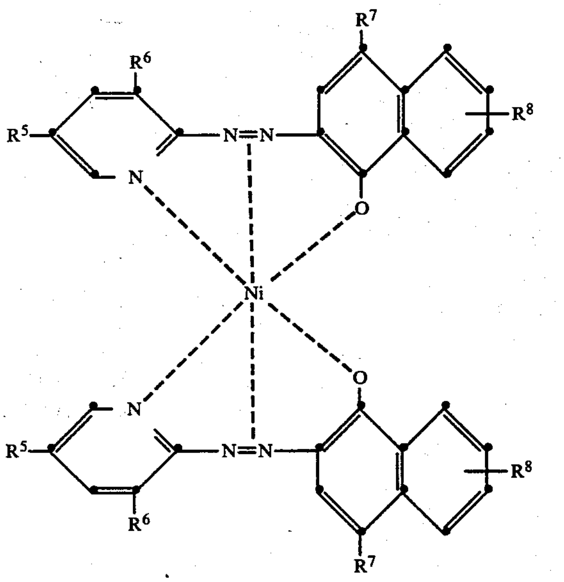
| | $R^5$ | $R^6$ | $R^7$ | $R^8$ |
|---|---|---|---|---|
| (5) | CAR | $—OCH_3$ | $—OCH(CH_3)COOH$ | H |
| (6) | CAR | $—OCH_3$ | $—OCH_3$ | 5-$NHSO_2CH_3$<br>7-$SO_2NH_2$ |
| (7) | CAR | $—OCH_3$ | $—OCH_2COOCH_3$ | 8-$NHSO_2CH_3$ |
| (8) | H | H | CAR | H |
| (9) | H | H | CAR* | H |
*only one $R^7$ is CAR, the other is $—SO_2NH_2$.
(10)
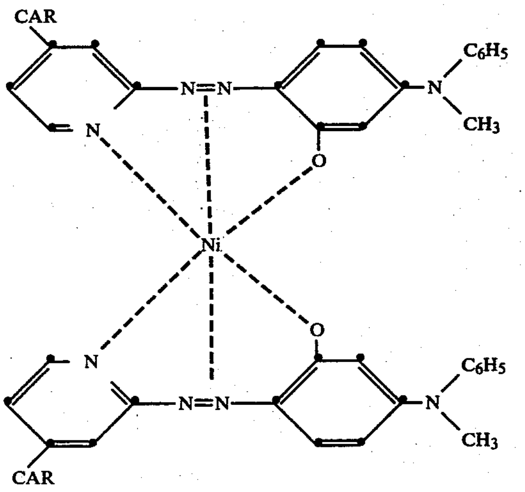
(11)

-continued

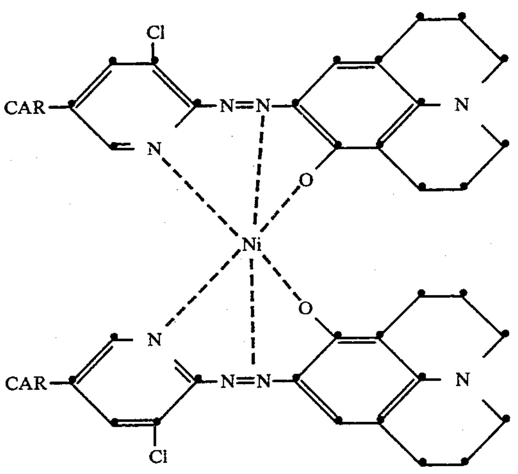

(12-16)

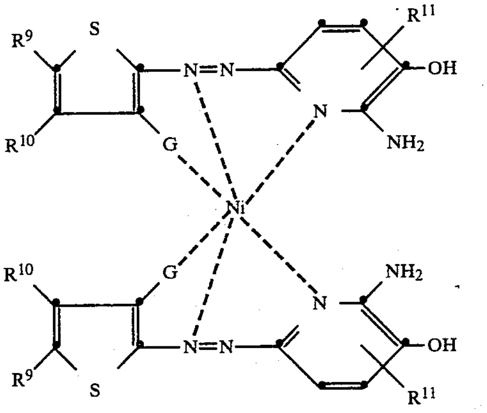

| | $R^9$ | $R^{10}$ | G | $R^{11}$ |
|---|---|---|---|---|
| (12) | $-CO-m-C_6H_4CAR$ | H | COO | H |
| (13) | $-CO-m-C_6H_4CAR$ | H | COO | $5-SO_2NH-iso\ C_3H_7$ |
| (14) | $-CO-m-C_6H_4-OH$ | $CH_3$ | COO | $5-SO_2-p-C_6H_4CAR$ |
| (15) | $-CO-m-C_6H_4-OH$ | H | COO | $5-SO_2-p-C_6H_4CAR$ |
| (16) | $-COCH(CH_3)_2$ | H | COO | $5-SO_2-p-C_6H_4CAR$ |

(17)

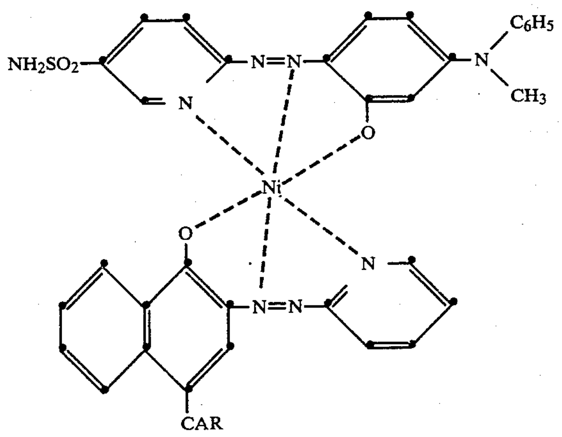

(18)

-continued

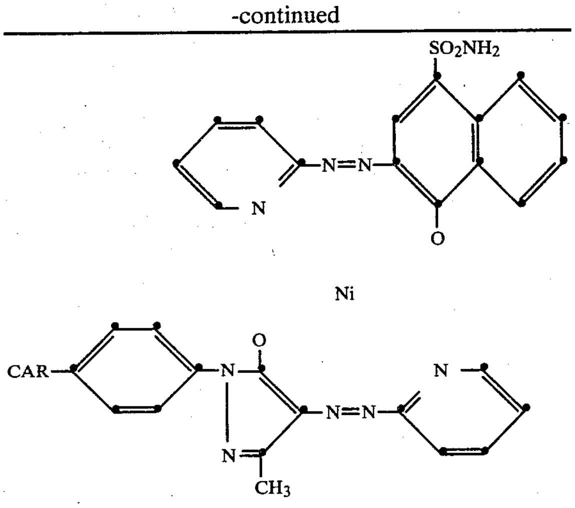

wherein CAR = 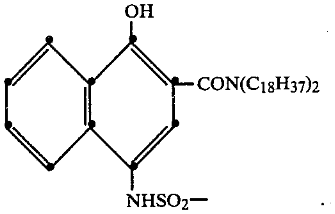

A process for producing a photographic transfer image in color according to the invention comprises:

(a) treating an imagewise-exposed photographic element as described above with an alkaline processing composition in the presence of a silver halide developing agent to effect development of each of the exposed silver halide emulsion layers;

(b) the dye-releasing compound then releasing the diffusible azo dye as described above imagewise as a function of the development of each of the silver halide emulsion layers; and (c) at least a portion of the imagewise distribution of the azo dye diffusing to a dye image-receiving layer to form a metal-complexed azo dye transfer image.

It will be appreciated that, after processing the photographic element described above, there remains in it after transfer has taken place an imagewise distribution of azo dye in addition to developed silver. A color image comprising residual nondiffusible compound is obtained in this element if the residual silver and silver halide are removed by any conventional manner well known to those skilled in the photographic art, such as a bleach bath, followed by a fix bath, a bleach-fix bath, etc. The imagewise distribution of azo dye may also diffuse out of the element into these baths, if desired, rather than to an image-receiving element. If a negative-working silver halide emulsion is employed in certain preferred photosensitive elements, described above, then a positive color image, such as a reflection print, a color transparency or motion picture film, is produced in this manner. If a direct-positive silver halide emulsion is employed in such photosensitive elements, then a negative color image is produced.

The photographic element in the above-described process can be treated in any manner with an alkaline processing composition to effect or initiate development. A preferred method for applying processing composition is by use of a rupturable container or pod which contains the composition. In general, the processing composition employed in this invention contains the developing agent for development, although the composition could also just be an alkaline solution where the developer is incorporated in the photographic element, image-receiving element or process sheet, in which case the alkaline solution serves to activate the incorporated developer.

A photographic film unit or assemblage in accordance with this invention is adapted to be processed by an alkaline processing composition, and comprises:

(1) a photographic element as described above; and (2) a dye image-receiving layer.

In this embodiment, the processing composition may be inserted into the film unit, such as by interjecting processing solution with communicating members similar to hypodermic syringes which are attached either to a camera or camera cartridge. The processing composition can also be applied by means of a swab or by dipping in a bath, if so desired. Another method of applying processing composition in a film assemblage which can be used in our invention is the liquid spreading means described in U.S. application Ser. No. 143,230 of Columbus, filed Apr. 24, 1980, abandoned in favor of continuation application Ser. No. 282,616, filed July 13, 1981, now U.S. Pat. No. 4,370,470, issued Jan. 25, 1983.

In a preferred embodiment of the invention, the assemblage itself contains the alkaline processing composition and means containing same for discharge within the film unit. There can be employed, for example, a rupturable container which is adapted to be positioned during processing of the film unit so that a compressive force applied to the container by pressure-applying members, such as would be found in a camera designed for in-camera processing, will effect a discharge of the container's contents within the film unit.

The dye image-receiving layer in the above-described film assemblage is optionally located on a separate support adapted to be superposed on the photographic element after exposure thereof. Such image-receiving elements are generally disclosed, for example, in U.S. Pat. No. 3,362,819. When the means for discharging the processing composition is a rupturable container, it is usually positioned in relation to the photographic element and the image-receiving element so that a compressive force applied to the container by pressure-applying members, such as would be found in a typical camera used for in-camera processing, will effect a discharge of the container's contents between the image-receiving element and the outermost layer of the photographic element. After processing, the dye image-receiving element is separated from the photographic element.

In another embodiment, the dye image-receiving layer in the above-described film assemblage is located integral with the photographic element and is located between the support and the lowermost photosensitive silver halide emulsion layer. One useful format for integral receiver-negative photographic elements is disclosed in Belgian Pat. No. 757,960. In such an embodiment, the support for the photographic element is transparent and is coated with an image-receiving layer, a substantially opaque light-reflective layer, e.g., $TiO_2$, and then the photosensitive layer or layers described above. After exposure of the photographic element, a rupturable container containing an alkaline processing composition and an opaque process sheet are brought into superposed position. Pressure-applying members in the camera rupture the container and spread processing composition over the photographic element as the film unit is withdrawn from the camera. The processing composition develops each exposed silver halide emulsion layer and dye images are formed as a function of development which diffuse to the image-receiving layer to provide a positive, right-reading image which is viewed through the transparent support on the opaque reflecting layer background. For other details concerning the format of this particular integral film unit, reference is made to the above-mentioned Belgian Pat. No. 757,960.

Another format for integral negative-receiver photographic elements in which the present invention is useful is disclosed in Canadian Pat. No. 928,559. In this embodiment, the support for the photographic element is transparent and is coated with the image-receiving layer, a substantially opaque, light-reflective layer and the photosensitive layer or layers described above. A rupturable container containing an alkaline processing composition and an opacifier is positioned adjacent the top layer and a transparent top sheet which has thereon a neutralizing layer and a timing layer. The film unit is placed in a camera, exposed through the transparent top sheet and then passed through a pair of pressure-applying members in the camera as it is being removed therefrom. The pressure-applying members rupture the container and spread processing composition and opacifier over the negative portion of the film unit to render it light-insensitive. The processing composition develops each silver halide layer and dye images are formed as a result of development which diffuse to the image-receiving layer to provide a positive, right-reading image which is viewed through the transparent support on the opaque reflecting layer background. For further details concerning the format of this particular integral film unit, reference is made to the abovementioned Canadian Pat. No. 928,559.

Still other useful integral formats in which this invention can be employed are described in U.S. Pat. Nos. 3,415,644; 3,415,645; 3,415,646; 3,647,437 and 3,635,707. In most of these formats, a photosensitive silver halide emulsion is coated on an opaque support and a dye image-receiving layer is located on a separate transparent support superposed over the layer outermost from the opaque support. In addition, this transparent support also preferably contains a neutralizing layer and a timing layer underneath the dye image-receiving layer.

Another embodiment of the invention uses the image-reversing technique disclosed in British Pat. No. 904,364, page 19, lines 1 through 41. In this process, the dye-releasing compounds are used in combination with physical development nuclei in a nuclei layer contiguous to the photosensitive silver halide emulsion layer. The film unit contains a silver halide solvent, preferably in a rupturable container with the alkaline processing composition.

The film unit or assembly used in the present invention is used to produce positive images in single- or multicolors. In a three-color system, each silver halide emulsion layer of the film assembly will have associated therewith a dye-releasing compound which releases a dye possessing a predominant spectral absorption within the region of the visible spectrum to which said silver halide emulsion is sensitive (initially or after forming the coordination complex), i.e., the blue-sensitive silver halide emulsion layer will have a yellow or yellow-forming dye-releaser associated therewith, the green-sensitive silver halide emulsion layer will have the magenta or magenta-forming dye-releaser of the invention associated therewith, and the red-sensitive silver halide emulsion layer will have a cyan or cyan-forming dye-releaser associated therewith. The dye-releaser associated with each silver halide emulsion layer is contained either in the silver halide emulsion layer itself or in a layer contiguous to the silver halide emulsion layer.

The concentration of the dye-releasing compounds that are employed in the present invention may be varied over a wide range, depending upon the particular compound employed and the results which are desired. For example, the dye-releasers of the present invention may be coated in layers by using coating solutions containing between about 0.5 and about 8 percent by weight of the dye-releaser distributed in a hydrophilic film-forming natural material or synthetic polymer, such as gelatin, polyvinyl alcohol, etc, which is adapted to be permeated by aqueous alkaline processing composition.

Depending upon which CAR is used in the present invention, a variety of silver halide developing agents or electron transfer agents (ETA's) are useful in this invention. In certain embodiments of the invention, any ETA can be employed as long as it cross-oxidizes with the dye-releasers described herein. The ETA may also be incorporated in the photosensitive element to be activated by the alkaline processing composition. Specific examples of ETA's useful in this invention include hydroquinone compounds, such as hydroquinone, 2,5-dichlorohydroquinone or 2-chlorohydroquinone; aminophenol compounds, such as 4-aminophenol, N-methylaminophenol, N,N-dimethylaminophenol, 3-methyl-4-aminophenol or 3,5-dibromoaminophenol; catechol compounds, such as catechol, 4-cyclohexylcatechol, 3-methoxycatechol or 4-(N-octadecylamino)-catechol; and phenylenediamine compounds, such as N,N,-N',N'-tetramethyl-p-phenylenediamine. In highly preferred embodiments, the ETA is a 3-pyrazolidinone compound, such as 1-phenyl-3-pyrazolidinone (Phenidone), 1-phenyl-4,4-dimethyl-3-pyrazolidinone (Dimezone), 4-hydroxymethyl-4-methyl-1-phenyl-3-pyrazolidinone, 4-hydroxymethyl-4-methyl-1-p-tolyl-3-pyrazolidinone, 4-hydroxymethyl-4-methyl-1-(3,4-dimethyl-phenyl)-3-pyrazolidinone, 1-m-tolyl-3-pyrazolidinone, 1-p-tolyl-3-pyrazolidinone, 1-phenyl-4-methyl-3-pyrazolidinone, 1-phenyl-5-methyl-3-pyrazolidinone, 1-phenyl-4,4-dihydroxymethyl-3-pyrazolidinone, 1,4-dimethyl-3-pyrazolidinone, 4-methyl-3-pyrazolidinone, 4,4-dimethyl-3-pyrazolidinone, 1-(3-chlorophenyl)-4-methyl-3-pyrazolidinone, 1-(4-chlorophenyl)-4-methyl-3-pyrazolidinone, 1-(3-chlorophenyl)-3-pyrazolidinone, 1-(4-chlorophenyl)-3-pyrazolidinone, 1-(4-tolyl)-4-methyl-3-pyrazolidinone, 1-(2-tolyl)-4-methyl-3-pyrazolidinone, 1-(4-tolyl)-3-pyrazolidinone, 1-(3-tolyl)-3-pyrazolidinone, 1-(3-tolyl)-4,4-dimethyl-3-pyrazolidinone, 1-(2-trifluoroethyl)-4,4-dimethyl-3-pyrazolidinone or 5-methyl-3-pyrazolidinone. A combination of different ETA's, such as those disclosed in U.S. Pat. No. 3,039,869, can also be employed. These ETA's are employed in the liquid processing composition or contained, at least in part, in any layer or layers of the photographic element or film unit to be activated by the alkaline processing composition, such as in the silver halide emulsion layers, the dye image-providing material layers, interlayers, image-receiving layer, etc.

In a preferred embodiment of the invention, the silver halide developer or ETA employed in the process becomes oxidized upon development and reduces silver halide to silver metal. The oxidized developer than cross-oxidizes the dye-releasing compound. The product of cross-oxidation then undergoes alkaline hydrolysis, thus releasing an imagewise distribution of diffusible azo dye which then diffuses to the receiving layer to provide the dye image. The diffusible moiety is transferable in alkaline processing composition either by virtue of its self-diffusivity or by its having attached to it one or more solubilizing groups, for example, a carboxy, sulpho, sulphonamido, hydroxy or morpholino group.

In using the dye-releasing compounds according to the invention which produce diffusible dye images as a function of development, either conventional negative-working or direct-positive silver halide emulsions are employed. If the silver halide emulsion employed is a direct-positive silver halide emulsion, such as an internal-image emulsion designed for use in the internal image reversal process or a fogged, direct-positive emulsion such as a solarizing emulsion, which is developable in unexposed areas, a positive image can be obtained in certain embodiments on the dye image-receiving layer. After exposure of the film unit, the alkaline processing composition permeates the various layers to initiate development of the exposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then cross-oxidizes the dye-releasing compounds and the oxidized form of the compounds then undergoes a base-catalyzed reaction to release the dyes imagewise as a function of the imagewise exposure of each of the silver halide emulsion layers. At least a portion of the imagewise distributions of diffusible dyes diffuse to the image-receiving layer to form a positive image of the original subject. After being contacted by the alkaline processing composition, a neutralizing layer in the film unit or image-receiving unit lowers the pH of the film unit or image receiver to stabilize the image.

Internal-image silver halide emulsions useful in this invention are described more fully in the November 1976 edition of *Research Disclosure,* pages 76 through 79, the disclosure of which is hereby incorporated by reference.

The various silver halide emulsion layers of a color film assembly employed in this invention are disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layers for absorbing or filtering blue radiation that is transmitted through the blue-sensitive layer. If desired, the selectively sensitized silver halide emulsion layers can be disposed in a different order, e.g., the blue-sensitive layer first with respect to the exposure side, followed by the red-sensitive and green-sensitive layers.

The rupturable container employed in certain embodiments of this invention is disclosed in U.S. Pat. Nos. 2,543,181; 2,643,886; 3,653,732; 2,723,051; 3,056,492;

3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

Generally speaking, except where noted otherwise, the silver halide emulsion layers employed in the invention comprise photosensitive silver halide dispersed in gelatin and are about 0.6 to 6 microns in thickness; the dye-releasers are dispersed in an aqueous alkaline solution-permeable polymeric binder, such as gelatin, as a separate layer about 0.2 to 7 microns in thickness; and the alkaline solution-permeable polymeric interlayers, e.g., gelatin, are about 0.2 to 5 microns in thickness. Of course, these thicknesses are approximate only and can be modified according to the product desired.

Scavengers for oxidized developing agent can be employed in various interlayers of the photographic elements of the invention. Suitable materials are disclosed on page 83 of the November 1976 edition of *Research Disclosure,* the disclosure of which is hereby incorporated by reference.

Any material is useful as the image-receiving layer in this invention as long as the desired function of mordanting or otherwise fixing the dye images is obtained. The particular material chosen will, of course, depend upon the dye to be mordanted. Suitable materials are disclosed on pages 80 through 82 of the November 1976 edition of *Research Disclosure,* the disclosure of which is hereby incorporated by reference.

Use of a neutralizing material in the film units employed in this invention will usually increase the stability of the transferred image. Generally, the neutralizing material will effect a reduction in the pH of the image layer from about 13 or 14 to at least 11 and preferably 5 to 8 within a short time after imbibition. Suitable materials and their functioning are disclosed on pages 22 and 23 of the July 1974 edition of *Research Disclosure,* and pages 35 through 37 of the July 1975 edition of *Research Disclosure,* the disclosures of which are hereby incorporated by reference.

A timing or inert spacer layer can be employed in the practice of this invention over the neutralizing layer which "times" or controls the pH reduction as a function of the rate at which alkali diffuses through the inert spacer layer. Examples of such timing layers and their functioning are disclosed in the *Research Disclosure* articles mentioned in the paragraph above concerning neutralizing layers.

The alkaline processing composition employed in this invention is the conventional aqueous solution of an alkaline material, e.g., alkali metal hydroxides or carbonates such as sodium hydroxide, sodium carbonate or an amine such as diethylamine, preferably possessing a pH in excess of 11, and preferably containing a developing agent as described previously. Suitable materials and addenda frequently added to such compositions are disclosed on pages 79 and 80 of the November 1976 edition of *Research Disclosure,* the disclosure of which is hereby incorporated by reference.

The alkaline solution-permeable, substantially opaque, light-reflective layer employed in certain embodiments of photographic film units used in this invention is described more fully in the November 1976 edition of *Research Disclosure,* page 82, the disclosure of which is hereby incorporated by reference.

The supports for the photographic elements used in this invention can be any material as long as it does not deleteriously affect the photographic properties of the film unit and is dimensionally stable. Typical flexible sheet materials are described on page 85 of the November 1976 edition of *Research Disclosure,* the disclosure of which is hereby incorporated by reference.

While the invention has been described with reference to layers of silver halide emulsions and dye image-providing materials, dotwise coating, such as would be obtained using a gravure printing technique, could also be employed. In this technique, small dots of blue-, green- and red-sensitive emulsions have associated therewith, respectively, dots of yellow, magenta and cyan color-providing substances. After development, the transferred dyes would tend to fuse together into a continuous tone. In an alternative embodiment, the emulsions sensitive to each of the three primary regions of the spectrum can be disposed as a single segmented layer, e.g., as by the use of microvessels, as described in Whitmore, U.S. patent application Ser. No. 184,714, filed Sept. 8, 1980, now U.S. Pat. No. 4,362,806, issued Dec. 7, 1982.

The silver halide emulsions useful in this invention, both negative-working and direct-positive ones, are well known to those skilled in the art and are described in *Research Disclosure,* Volume 176, December 1978, Item No. 17643, pages 22 and 23, "Emulsion preparation and types"; they are usually chemically and spectrally sensitized as described on page 23, "Chemical sensitization", and "Spectral sensitization and desensitization", of the above article; they are optionally protected against the production of fog and stabilized against loss of sensitivity during keeping by employing the materials described on pages 24 and 25, "Antifoggants and stabilizers", of the above article; they usually contain hardeners and coating aids as described on page 26, "Hardeners", and pages 26 and 27, "Coating aids", of the above article; they and other layers in the photographic elements used in this invention usually contain plasticizers, vehicles and filter dyes described on page 27, "Plasticizers and lubricants"; page 26, "Vehicles and vehicle extenders"; and pages 25 and 26, "Absorbing and scattering materials"; of the above article; they and other layers in the photographic elements used in this invention can contain addenda which are incorporated by using the procedures described on page 27, "Methods of addition", of the above article; and they are usually coated and dried by using the various techniques described on pages 27 and 28, "Coating and drying procedures", of the above article, the disclosures of which are hereby incorporated by reference.

The term "nondiffusing" used herein has the meaning commonly applied to the term in photography and denotes materials that, for all practical purposes, do not migrate or wander through organic colloid layers, such as gelatin, in the photographic elements of the invention in an alkaline medium and preferably when processed in a medium having a pH of 11 or greater. The same meaning is to be attached to the term "immobile". The term "diffusible" as applied to the materials of this invention has the converse meaning and denotes materials having the property of diffusing effectively through the colloid layers of the photographic elements in an alkaline medium. "Mobile" has the same meaning as "diffusible".

The term "associated therewith" as used herein is intended to mean that the materials can be in either the same or different layers, so long as the materials are accessible to one another.

The following examples are provided to further illustrate the invention.

EXAMPLE 1

Preparation of Compound 1

Compound 2 of U.S. Pat. No. 4,207,104 was prepared as described therein. A solution of that compound (10.0 g, 0.01 mole) in dimethylformamide (DMF) (80 ml) was added to a solution of nickel (II) chloride hexahydrate (6.0 g, 0.025 mole) also in DMF (120 ml) and the resulting magenta-colored solution stirred at room temperature for one hour. The solution was poured into dilute acetic acid (water, 2 l and acetic acid, 200 ml); and the precipitated RDR collected by filtration, washed with water and dried to yield 10.2 g of Compound 1 above, M.P. 85°-90° C. TLC ($SiO_2$-$CHCl_3$) showed one major product $R_f$ 0.8.

Analysis Found: C, 70.3; H, 8.6; N, 6.6; S, 2.9; Ni, 2.9%. $C_{124}H_{180}N_{10}O_{10}S_2Ni$ Requires: C, 71.1; H, 8.7; N, 6.7; S, 3.1; Ni, 2.8%.

EXAMPLE 2

Testing of Compound 1

The wavelength at maximum absorption for Compound 1 was measured in a chloroform solution. A λ-½ of 536 nm was obtained. λ-½ is the midpoint of a line drawn across the absorption curve at one-half the height of maximum absorption. A half bandwidth (HBW) of 96 nm was also obtained. HBW is the wavelength range of the curve at one-half the maximum density. A narrow HBW (generally anything less than 100) indicates a pure hue.

EXAMPLE 3

Photographic Tests of Compound 1

(A) A control receiving element was prepared by coating the following layers in the order recited on a poly(ethylene terephthalate) film support. Quantities are parenthetically given in grams per square meter.

(1) metallizing layer of gelatin (1.1), nickel sulfate (0.58), butanediol diglycidyl ether (0.12) and formaldehyde (0.12); and (2) image-receiving layer of poly(vinylimidazole), 5-10% quaternized with 2-chloroethanol, (2.15), gelatin (2.15) and butanediol diglycidyl ether (0.22).

(B) Another receiving element was prepared similar to (A) except that the nickel sulfate was omitted.

(C) A coated photographic element was prepared by coating the following layers in the order recited on a poly(ethylene terephthalate) film support. Quantities are parenthetically given in grams per square meter unless otherwise stated.

(1) Silver chlorobromide emulsion (0.86 Ag) and gelatin (1.1);

(2) Magenta RDR (A) (1.08 mmole/m²) and gelatin (3.77); and (3) Overcoat layer of gelatin (0.27).

Magenta RDR (A)
(Unmetallized)

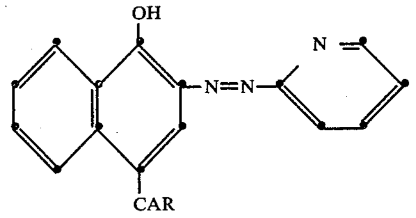

wherein CAR =

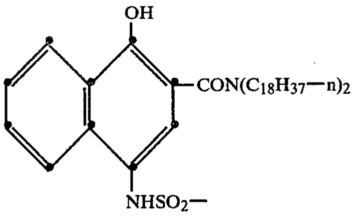

(Compound 2 of U.S. Pat. No. 4,207,104)

(D) A coated photographic element was prepared similar to (C) except that in layer 2, Compound 1 above was employed (the premetallized 2:1 counterpart).

A processing composition was prepared as follows:

| | |
|---|---|
| Potassium hydroxide | 42 g |
| Potassium bromide | 20 g |
| 5-Methylbenzotriazole | 5 g |
| Benzyl alcohol | 5 ml |
| 11-Aminoundecanoic acid | 5 g |
| Sodium ethylenediaminetetraacetate | 30 g |
| 4-hydroxymethyl-4-methyl-1-phenyl-3-pyrazolidinone | 1 g |
| Water to make | 1 liter |

Photographic elements (C) and (D) were then exposed through a step-wedge and processed by soaking in the processing composition above at 20° C. for 20 seconds and then laminated to receiving elements (A) and (B) respectively for five minutes and then peeled apart. The transmission densities were then read with the following sensitometric results.

TABLE 1

| Receiver | Photographic Element with RDR | Density Dmax | Density Dim |
|---|---|---|---|
| (A) With Metallizing Layer | (C) Unmetallized (Control) | 0.95 | 0.21 |
| (B) No Metallizing Layer | (D) Premetallized 2:1 Complex | 0.99 | 0.08 |

The above results indicate that use of a premetallized 2:1 complex of an RDR in accordance with our invention provides a higher Dmax and a lower Dmin at the same laminating time when compared to its metallizable counterpart which is metallized in the receiver.

EXAMPLE 4

Multicolor Photographic Test of Compounds 1 & 2

(A) A control receiving element was prepared by coating the following layers in the order recited on a poly(ethylene) coated paper support. Quantities are parenthetically given in grams per square meter.

(1) metallizing layer of gelatin (1.1), nickel sulfate (0.58), 4-hydroxymethyl-4-methyl-1-phenyl-3-pyrazolidinone (0.32) and formaldehyde (0.12); and (2) image-receiving layer of poly(vinylimidazole), 5–10% quaternized with 2-chloroethanol, (2.15), gelatin (2.15) and butanediol diglycidyl ether (0.11).

(B) Another receiving element was prepared similar to (A) except that the nickel sulfate was omitted.

(C) A photographic element was prepared by coating the following layers in the order recited on a poly(ethylene terephthalate) film support. Quantities are parenthetically given in grams per square meter unless otherwise stated:

(1) Cyan RDR(B) (0.96), gelatin (1.20) and bis(vinylsulfonylmethyl) ether (0.009);

(2) Red-sensitive silver chloride emulsion (0.88μ, Ag 0.52), gelatin (0.80), bis(vinylsulfonylmethyl) ether (0.006) and 1-(3-acetamidophenyl)-5-mercaptotetrazole sodium salt (300 mg/Ag mole);

(3) interlayer of gelatin (1.08), 5-cyanoethylthio-1-phenyltetrazole (0.01), bis(vinylsulfonylmethyl) ether (0.008) and 2,5-didodecylhydroquinone (0.70);

(4) magenta RDR(A) (1.20), gelatin (1.20) and bis(-vinylsulfonylmethyl) ether (0.009);

(5) green-sensitive silver chloride emulsion (0.33μ, Ag 0.65), gelatin (1.20), bis(vinylsulfonylmethyl) ether (0.009) and 1-(3-acetamidophenyl)-5-mercaptotetrazole sodium salt (100 mg/Ag mole);

(6) interlayer of gelatin (1.08), Carey Lea Silver (0.18), bis(vinylsulfonylmethyl) ether (0.008) and 2,5-didodecylhydroquinone (0.70);

(7) yellow RDR(C) (0.86), gelatin (1.20) and bis(-vinylsulfonylmethyl) ether (0.009);

(8) blue-sensitive silver chloride emulsion (0.88μ, Ag 0.52), gelatin (0.80), bis(vinylsulfonylmethyl) ether (0.006), 1-(3-acetamidophenyl)-5-mercaptotetrazole sodium salt (75 mg/Ag mole) and 2,5-didodecylhydroquinone (0.09); and (9) overcoat layer of gelatin (0.60), 5-cyanoethylthio-1-phenyltetrazole (0.018) and bis(vinylsulfonylmethyl) ether (0.005).

Cyan RDR (B)
(Unmetallized)

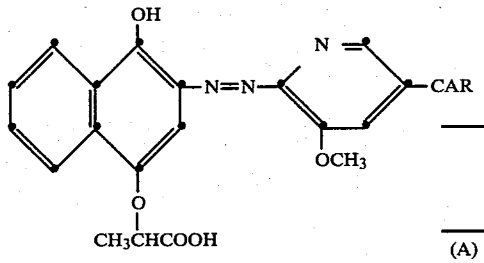

-continued wherein CAR is

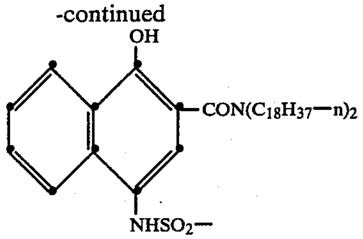

Yellow RDR (C)
(Unmetallized)

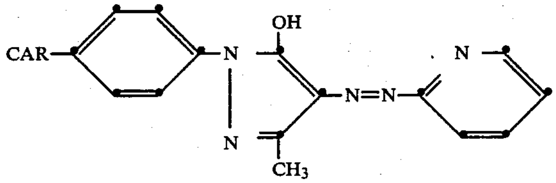

wherein CAR is

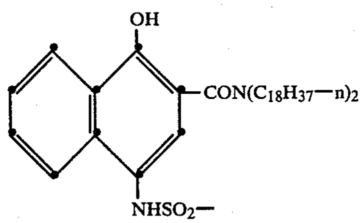

(D) A photographic element similar to (C) was prepared except that in layer 1, Compound 2 above was employed (the premetallized 2:1 counterpart) and in layer 4, Compound 1 above was employed (the premetallized 2:1 counterpart).

A processing composition was prepared as follows:

| | |
|---|---|
| Potassium hydroxide | 33.6 g |
| 5-Methylbenzotriazole | 3.0 g |
| Potassium bromide | 2.0 g |
| 11-Aminoundecanoic acid | 2.0 g |
| Water to make | 1 Liter |

Photographic elements (C) and (D) were then exposed through a step-wedge and processed by soaking in the processing composition above at 20° C. for 20 seconds and then laminated to receiving elements (A) and (B) respectively for three minutes and then peeled apart. The reflection densities were then read on a sensitometer with the following results:

TABLE 2

| Receiver | Photographic Element with RDR's | Densities Red Dmax | Red Dmin | Green Dmax | Green Dmin |
|---|---|---|---|---|---|
| (A) With Metallizing Layer (Control) | (C) Unmetallized (Control) | 2.1 | 0.32 | 1.82 | 0.31 |
| (B) No Metallizing Layer | (D) Premetallized 2:1 Complex | 1.7 | 0.05 | 2.02 | 0.08 |

The above results indicate that in a multicolor element, use of premetallized 2:1 complexes of RDR's in accordance with the invention provides a higher Green Dmax and substantially lower Red and Green Dmin's at the same lamination time when compared to the metallizable counterparts which are metallized in the receiver.

EXAMPLE 5

Photographic Test for Compound 4

Example 3, elements B and D, were repeated except that Compound 4 was employed in the photographic element. It was processed in the same manner as in Example 3 with the following sensitometric results:

Dmax 0.87 and Dmin 0.11

EXAMPLE 6

Photographic Test for Compound 2

Example 3, elements B and D, were repeated except that Compound 2 (1.0 mmole/$m^2$) was employed in the photographic element. It was processed in the same manner as in Example 3 and the transmission densities achieved after 5 and 10 minutes were as follows:

| Density @ 5 Minutes | Density @ 10 Minutes |
|---|---|
| 0.87 | 1.18 |

The maximum densities at 5 and 10 minutes expressed as a percentage of the maximum densities at 20 minutes were as follows:

| Density % @ 5 Minutes | Density % @ 10 Minutes |
|---|---|
| 58 | 78 |

EXAMPLE 7

Dye Diffusion Tests

A number of 2:1 metal-complexed released dyes as shown below were subjected to two diffusion tests. The "solution test" described in detail below, involves dissolving the metallized dye in a viscous composition and transferring it to a receiving element as described below.

The "gel pad test" described in detail below, involves imbibing the dye from solution into a thick gelatin layer, and then transferring it by direct lamination to a receiving element, as described below, which has been preswollen by soaking for five minutes in a solution of 0.1 N potassium hydroxide.

A receiving element was prepared by coating the following layers in the order recited on a poly(ethylene terephthalate) film support. Quantities are parenthetically given in grams per square meter.

(1) image-receiving layer of poly(styrene-co-N-vinylbenzyl-N-benzyl-N,N-dimethylammonium chloride-co-divinylbenzene) (2.28) and gelatin (2.28);

(2) reflecting layer of titanium dioxide (16.1) and gelatin (2.03);

(3) opaque layer of carbon black (1.88) and gelatin (1.23); and (4) overcoat layer of gelatin (4.3).

Solution Test

Approximately 0.075 mmol of each of the complexed released dyes as shown below, was dissolved in 10 ml of 0.125 N potassium hydroxide. After the dye was completely dissolved, 20 ml of a viscous composition was added. The resulting solution, stirred for at least 20 minutes, was 0.0025 M in dye at a pH of 13.4. The viscous composition was prepared from 46.2 g potassium hydroxide and 54 g carboxymethylcellulose dissolved in 1200 ml water. The dye solution was then spread between the receiver and a clear polyester cover sheet between spaced rollers so that the gap containing the viscous composition had a thickness of 102 μm. The time zero was taken at the point at which half of the laminate had passed through the rollers. The appearance of dye on the mordant was measured at λ-max as diffuse reflection density vs. time. The reflection density was converted to transmission density by computer with the aid of a mathematical relation derived from a previous calibration. A plot of transmission density, which is proportional to concentration, vs. time was derived; and the value of $t_{½}$ of dye transfer, the time required to obtain one-half of the maximum transmission density, calculated.

Gel Pad Test

A donor element, containing a thick pad of dionized acid processed gelatin (26 g/$m^2$) hardened with 2% bis(vinylsulfonylmethyl)ether, was imbibed with a solution 0.1 M in potassium hydroxide and $1.3\times10^{-3}$ M in dye. The pad was soaked to full penetration, surface wiped, and then laminated in direct contact to the above receiving element which had been presoaked for five minutes in 0.1 M KOH. The $t_{½}$ of dye transfer was obtained as in the solution test. The diffusion times by the gel pad test are substantially longer than by the solution test. The following results were obtained:

TABLE 3

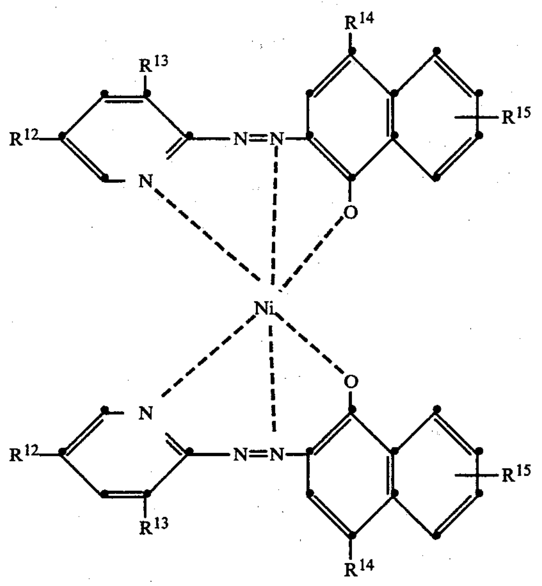

| | | | | | Diffusion Tests t½ (sec) | |
|---|---|---|---|---|---|---|
| Compound | $R^{12}$ | $R^{13}$ | $R^{14}$ | $R^{15}$ | Solution | Gel Pad |
| A | $-SO_2NH_2$ | $-OCH_3$ | $-OCH(CH_3)COOH$ | H | — | 520 |
| B | $-SO_2NH-m-C_6H_4-OH$ | $-OCH_3$ | $-OCH(CH_3)COOH$ | H | — | 537 |
| C | $-SO_2NH-m-C_6H_4SO_2-NH_2$ | $-OCH_3$ | $-OCH(CH_3)COOH$ | H | — | 535 |
| D | $-SO_2NH_2$ | $-OCH_3$ | $-OCH_3$ | { 5-$NHSO_2CH_3$, 7-$SO_2NH_2$ | 72 | 250 |
| E | $-SO_2NH_2$ | $-OCH_3$ | $-OCH_3$ | { 6-$SO_2NH_2$, 8-$OCH_3$ | 59 | 409 |
| F | $-SO_2NH_2$ | $-OCH_3$ | $-OCH_2COOCH_3$ | H | — | 475 |
| G | H | H | $-SO_2NH_2$ | H | 49 | 281 |
| H | H | H | $-SO_2NH-C_6H_3-$ 2-$OCH_3-5-SO_2NH_2$ | H | — | 947 |

| | | Diffusion Tests t½ (sec) | |
|---|---|---|---|
| Compound | | Solution | Gel Pad |
| I | 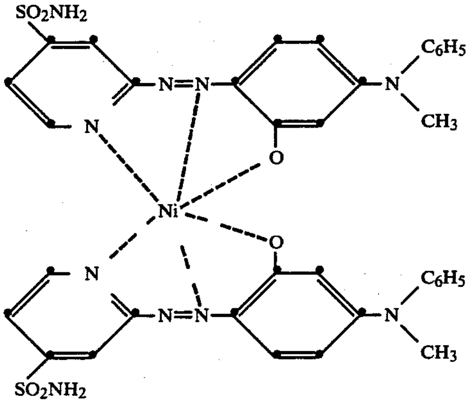 | 45 | 265 |

TABLE 3-continued
| | | | |
|---|---|---|---|
| J | 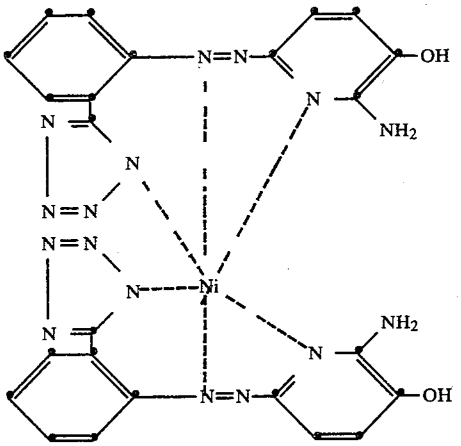 | 69 | 465 |
| K | 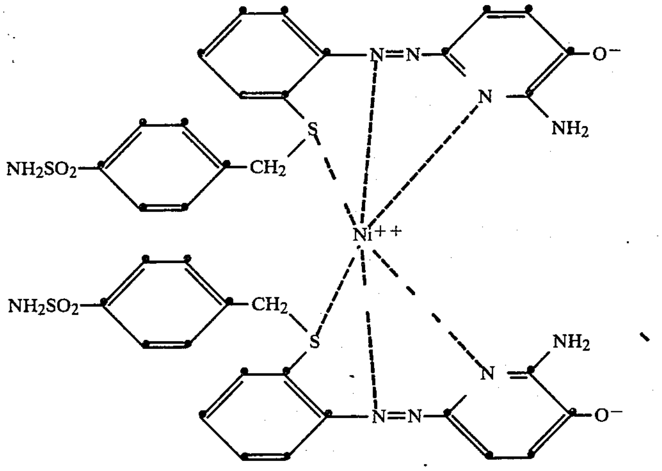 | 265 | 372 |
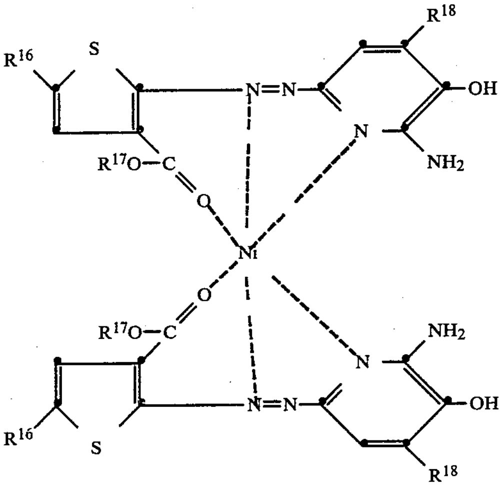
| Compound | $R^{16}$ | $R^{17*}$ | $R^{18}$ | Diffusion Tests $t_{\frac{1}{2}}$ (sec) Solution | Gel Pad |
|---|---|---|---|---|---|
| L | $-CO-$m-$C_6H_4-SO_2NH_2$ | $(CH_2)_2CN$ | $CH_3$ | — | 719 |
| M | $-CO-$m-$C_6H_4-SO_2NH_2$ | $(CH_2)_2CN$ | H | 100 | 451 |
| N | $-CO-$m-$C_6H_4-SO_2NH_2$ | H | H | 93 | — |
| O | $-CO-$m-$C_6H_4-SO_2NH_2$ | $C_2H_5$ | H | 144 | — |
| P | $-CO-$m-$C_6H_4OH$ | $C_2H_5$ | H | 73 | — |

TABLE 3-continued

| |
|---|
| $SO_2NH_2$ |

*Dye on receiver is the Ni carboxylate complex.

EXAMPLE 8

Photographic Test of Compounds 5–16

Photographic elements were prepared by coating the following layers in the order recited on a poly(ethylene terephthalate) film support. Quantities are parenthetically given in grams per square meter unless otherwise stated:

(1) RDR Compound (see Table below for identification and amount) in ½ its weight of diethyllauramide, potassium 5-s-octadecylhydroquinone-2-sulfonate (0.022), 1-phenyl-2-pyrazolin-3-yl N-methyl-N-[2-(N-methyltrifluoroacetamidomethyl)-4-(p-toluenesulfonamido)phenyl]carbamate (0.54) and gelatin (2.8);

(2) green-sensitive silver chloride emulsion (0.39 Ag), deionized gelation (0.86), 1-(m-acetamidophenyl-2-tetrazoline-5-thione (350 mg/mole Ag), and octadecylquinone (5 g/mole Ag); and (3) overcoat layer of 2,5-di-sec-dodecylhydroquinone (0.32) and deionized gelatin (0.54).

A receiving element was prepared by coating the following layers in the other recited on a polyethylene-coated paper support. Quantities are parenthetically stated in g/m$^2$.

(1) gelatin (0.81) and (2) poly(N-vinylimidazole) (1.6) and gelatin (1.6).

Each photographic element was given a full exposure to D-max, and then soaked for 15 seconds in an activator containing per liter of developer: 33.7 g potassium hydroxide, 2.0 g potassium bromide, 3.0 g 5-methylbenzotriazole, and 2.0 g 11-aminoundecanoic acid. Each photographic element was then laminated to the receiver as described above. The laminate was then cut into four pieces and placed on a constant temperature (24° C.) block. The four receiver pieces were peeled off after 1, 3, 5, and 10 minutes, each dried and the Status A density recorded. The access time is taken as the first of the strips to achieve a constant density on the receiver. The λ-max is from the spectrum of the nickel complex on poly(N-vinylimidazole). The following results were obtained.

TABLE 4

| DRR Compound | DRR Conc. (Moles/m$^2$) | Access Time (Min.) | Dmax | λmax |
|---|---|---|---|---|
| 5 | $1.6 \times 10^{-4}$ | 3 | 1.58 | 655 |
| 6 | $1.6 \times 10^{-4}$ | 3 | 2.16 | 670 |
| 7 | $1.6 \times 10^{-4}$ | 5 | 2.15 | 670 |
| 8 | $2.2 \times 10^{-4}$ | 3 | 1.72 | 530 |
| 9 | $2.2 \times 10^{-4}$ | 3 | 1.79 | 530 |
| 10 | $2.2 \times 10^{-4}$ | 3 | 1.40 | 535 |
| 12 | $1.6 \times 10^{-4}$ | 3 | 2.18 | 628 |
| 13 | $1.6 \times 10^{-4}$ | 3 | 1.27 | 655 |
| 14 | $1.6 \times 10^{-4}$ | 5 | 1.67 | 642 |
| 15 | $1.6 \times 10^{-4}$ | 3 | 0.58 | 655 |
| 16 | $1.6 \times 10^{-4}$ | 3 | 0.76 | 644 |

The invention has been described in detail with particular reference to preferred embodiments thereof, but it will be understood that variations and modifications can be effected within the spirit and scope of the invention.

What is claimed is:

1. A nondiffusible compound having a releasable azo dye moiety, said compound having the following formula:

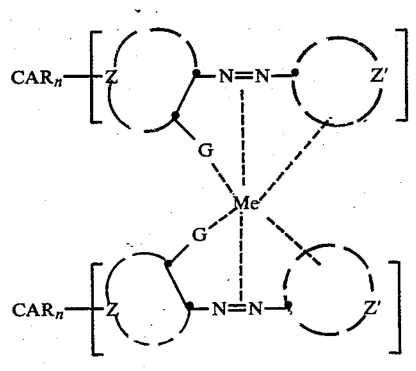

wherein:

(a) each Z independently represents the atoms necessary to complete an aromatic carbocyclic or heterocyclic nucleus having at least one ring of 5 to 7 atoms;

(b) each Z' independently represents an aromatic carbocyclic or heterocyclic nucleus having at least one ring of 5 to 7 atoms, said Z' having, in a position adjacent to the point of attachment to the azo linkage, either (i) a nitrogen atom in said ring of said nucleus which acts as a chelating site, or (ii) a carbon atom in said ring of said nucleus having directly attached thereto a nitrogen atom which acts as a chelating site;

(c) G is a metal chelating group;

(d) each CAR independently represents a ballasted carrier moiety which will release said diffusible azo dye under alkaline conditions;

(e) Me is a polyvalent, hexacoordinate metal ion; and (f) each n is 0 or 1, with the proviso that at least one n is 1.

2. The compound of claim 1 wherein each Z represents the atoms necessary to complete a naphthyl nucleus and each Z' represents a pyridine nucleus.

3. The compound of claim 1 wherein each Z and each Z' independently represents the atoms necessary to complete a pyrazole nucleus.

4. The compound of claim 1 wherein G is amino, alkylthio or the conjugate base of hydroxy, carboxy, sulfonamido or sulfamoyl.

5. The compound of claim 1 wherein said polyvalent, hexacoordinate metal ion is either copper (II), zinc (II), platinum (II), palladium (II), cobalt (II), cobalt (III), chromium (III), or nickel (II).

6. The compound of claim 1 wherein said polyvalent, hexacoordinate metal ion is nickel (II).

7. The compound of claim 1 wherein said CAR is a group having the formula:

(Ballast-Carrier-Link)— wherein:

(a) Ballast is an organic ballasting radical of such molecular size and configuration as to render said compound nondiffusible in a photographic element during development in an alkaline processing composition;
(b) Carrier is an oxidizable acyclic, carbocyclic or heterocyclic moiety; and
(c) Link represents a group which, upon oxidation of said carrier moiety, is capable of being hydrolytically cleaved to release said diffusible dye.

8. The compound of claim 7 wherein the Carrier moiety contains atoms according to the following configuration:

$$a\,(-C{=}C)_b-$$

wherein:
b is a positive integer of 1 to 2; and
a represents the radicals OH, SH, NH— or hydrolyzable precursors thereof.

9. The compound of claim 1 wherein said CAR is a group having the formula:

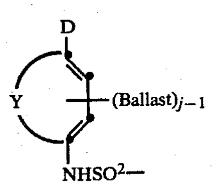

wherein:
(a) Ballast is organic ballasting radical of such molecular size and configuration as to render said compound nondiffusible in a photographic element during development in an alkaline processing composition;
(b) D is $OR^1$ or $NHR^2$ wherein $R^1$ is hydrogen or a hydrolyzable moiety and $R^2$ is hydrogen or substituted or unsubstituted alkyl group of 1 to 22 carbon atoms;
(c) Y represents the atoms necessary to complete a benzene nucleus, a naphthalene nucleus, or a 5 to 7 membered heterocyclic ring; and
(d) j is a positive integer of 1 to 2 and is 2 when D is $OR^1$ or when $R^2$ is hydrogen or an alklyl group of less than 8 carbon atoms.

10. The compound of claim 9 wherein D is OH, J is 2 and Y is a naphthalene nucleus.

11. The compound of claim 1 wherein said CAR will release said diffusible azo dye moiety as an inverse function of development of a silver halide emulsion layer under alkaline conditions.

12. The compound of claim 11 wherein said CAR is a group having the formula:

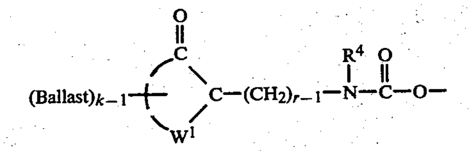

wherein:
Ballast is an organic ballasting radical of such molecular size and configuration as to render said compound nondiffusible in a photographic element during said development in an alkaline processing composition;
$W^1$ represents at least the atoms necessary to complete a quinone nucleus;
r is a positive integer of 1 or 2;
$R^4$ is alkyl having 1 to about 40 carbon atoms or aryl having 6 to about 40 carbon atoms; and
k is a positive integer of 1 to 2 and is 2 when $R^4$ has of less than 8 carbon atoms.

13. The compound of claim 11 wherein said CAR is a group having the formula:

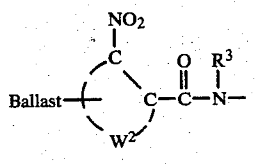

wherein:
Ballast is an organic ballasting radical of such molecular size and configuration as to render said compound nondiffusible in a photographic element during said development in an alkaline processing composition:
$W^2$ represents at least the atoms necessary to complete a benzene nucleus; and
$R^3$ is alkyl having 1 to about 4 carbon atoms.

14. The compound of claim 11 wherein said CAR is a group having the formula:

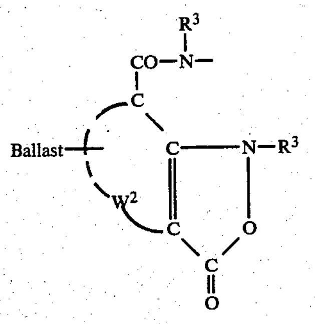

wherein:
Ballast is organic ballasting of such molecular size and configuration as to render said compound nondiffusible in a photographic element during said development in an alkaline processing composition;
$W^2$ represents at least the atoms necessary to complete a benzene nucleus; and
$R^3$ is an alkyl radical having 1 to about 4 carbon atoms.

15. The compound of claim 11 wherein said CAR is a group having the formula:

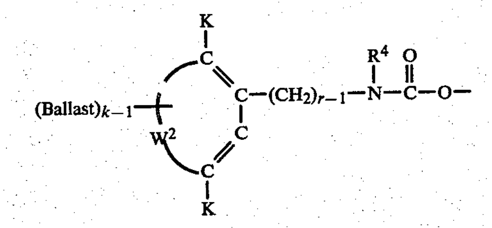

wherein:
Ballast is an organic ballasting radical of such molecular size and configuration as to render said compound nondiffusible in a photographic element during said development in an alkaline processing composition;

$W^2$ represents at least the atoms necessary to complete a benzene nucleus;

r is a positive integer of 1 or 2;

$R^4$ is alkyl having 1 to about 40 carbon atoms or aryl having 6 to about 40 carbon atoms;

k is a positive integer of 1 to 2 and is 2 when $R^4$ has less than 8 carbon atoms; and K is OH or a hydrolyzable precursor thereof.

16. The compound of claim 1 which has the formula:

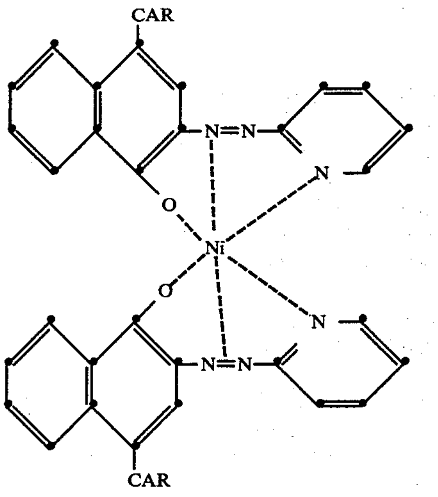

where CAR is

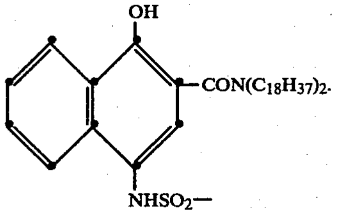

17. The compound of claim 1 which has the formula:

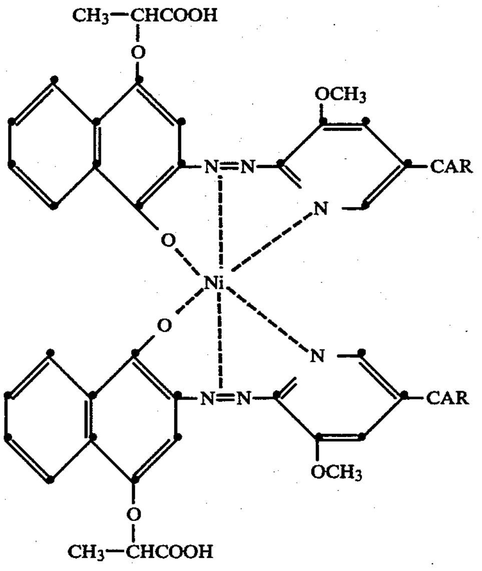

-continued where CAR is

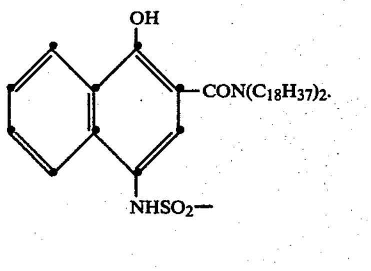

18. The compound of claim 1 which has the formula:

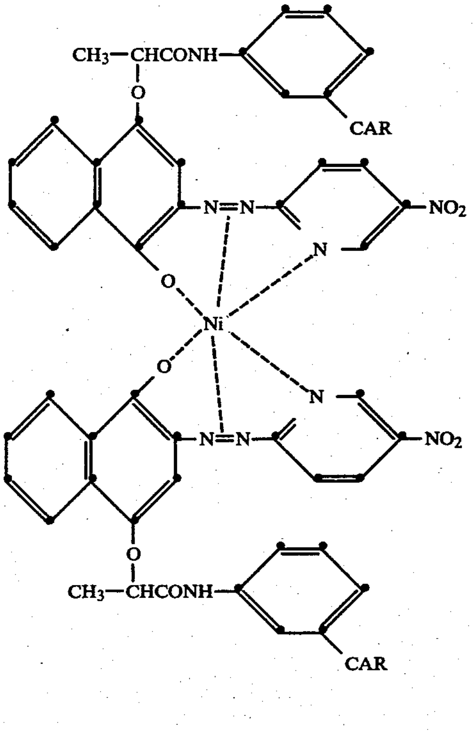

where CAR is

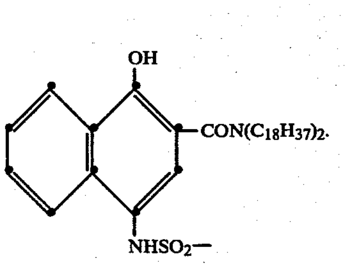

19. The compound of claim 1 which has the formula:

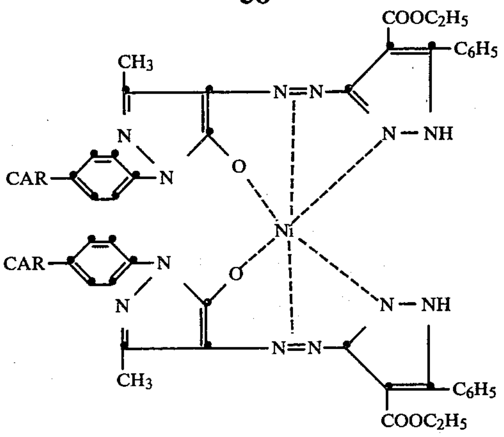
where CAR is 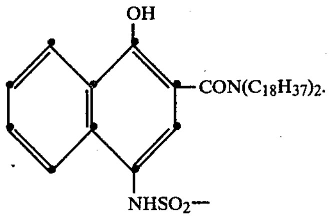
* * * * *